Patented July 2, 1946

2,403,213

UNITED STATES PATENT OFFICE 2,403,213

SYNTHETIC RESIN BONDED ABRASIVE

Gaetano F. D'Alelio, Northampton, Mass., assignor to Pro-phy-lac-tic Brush Company, Northampton, Mass., a corporation of Delaware No Drawing. Application June 16, 1944,
Serial No. 540,741

12 Claims. (Cl. 51—298)

This invention relates to heat convertible compositions which are particularly adapted for molding but may be used for other purposes. More specifically, the invention relates to a heat convertible composition having as an essential component a soluble and fusible partial copolymerization product of a mixture of diallyl maleate and a vinyl aryl compound with or without another copolymerizable compound.

The invention provides a novel heat convertible molding composition and method of molding. It also provides a novel abrasive article and method of making the same.

The practice of the invention is particularly adapted for molding polymers and copolymers which are rapidly heat convertible from a soluble and fusible mass to an insoluble and infusible mass, such as copolymers of diallyl maleate and a vinyl aryl compound. The method involves isolating the soluble and fusible copolymerization product in the form of a powder. The solid copolymer or powder and a liquid copolymerizable monomer are mixed thoroughly, as by mixing in a heated Banbury mixer, to form a molding composition which is a substantially dry crumbly mass when cooled. In order to facilitate mixing of the polymer and liquid monomer, the monomer may be mixed first with a volatile miscible liquid, such as a solvent for the copolymer. This mixture then is added to and thoroughly mixed with the partial polymer without heating. The volatile solvent then is removed by evaporation. The heat convertible molding composition can be molded under heat and pressure to the exact shape desired without appreciable shrinkage.

Another feature of the present invention is based upon my discovery that copolymers of diallyl maleate and a vinyl aryl compound are good binders for abrasive articles.

In the practice of the invention I may employ a vinyl aryl compound or similar compounds of the structure $$CH_2=CRZ$$

wherein R is hydrogen or a methyl radical and Z is an aryl radical or a substituted aryl radical, examples of which are phenyl; the chlorphenyls; for example, the mono-, di-, and trichlorphenyls; the nitrophenyls; tolyl; the carbalkoxyphenyls; for example, the methyl, ethyl, and propyl derivatives, etc.

As specific examples of the vinyl aryl compounds may be mentioned styrene, isopropenyl benzene, isopropenyl toluene, monochlorstyrene, dichlorstyrene, trichlorstyrene, vinyl methyl benzoate, vinyl ethyl benzoate, nitrostyrene, nitrovinyl toluene, etc.

Abrasive articles have been made with a binder of synthetic resins, such as phenolic resins and urea-aldehyde resins. The molding of abrasive articles having binders of this type present special problems because by-products are formed when curing these resins. Consequently, it has been difficult to mold the article to the exact shape desired. It has also been proposed to produce abrasive articles by casting a mixture of abrasive particles and a polymerizable liquid binder. Such casting processes often require several days and result in large shrinkage of the article. The present invention avoids these difficulties and makes possible molding of abrasive articles to exact shape in a few minutes. The binder of the invention possesses high heat resistance and is not fragile or distortable and possesses excellent resistance to water, alcohol, mineral oil, glycerine, etc.

In making a molded abrasive article I prepare, for example, a heat convertible, soluble, fusible partial copolymer of diallyl maleate and styrene. This is a free flowing white powder and is the base material for my binder for abrasive articles. This base material together with a polymerization catalyst then is dissolved in a mixture of a liquid copolymerizable monomer and acetone or other volatile liquid which may be a solvent for the copolymer. This forms a viscous solution which then is thoroughly mixed with the abrasive particles. The pasty mass thus formed is dried to remove the volatile liquid and leave a dry crumbly mass which is a uniform mixture of abrasive particles in a heat convertible binder composition of a liquid monomer and a soluble, fusible partial copolymer of diallyl maleate and styrene. The styrene may be replaced wholly or in part by another vinyl aryl compound. The liquid monomer serves as a temporary plasticizer for the partial copolymer and may be a diallyl maleate or other monomer which is copolymerizable with the partial copolymer and has at least one

group and at least one other polymerizable ethylenic group. The dry crumbly mass may be molded under heat and pressure to form an abrasive article of desired shape in which the abrasive particles are held in a hard, strong, insoluble and infusible binder or matrix formed by copolymerization of the liquid monomer and partial copolymer.

To make an abrasive paper or cloth, the soluble, fusible partial copolymer of diallyl maleate and styrene or other vinyl aryl compound together with a catalyst is dissolved in a mixture of the liquid monomer and a volatile solvent for the copolymer and thoroughly mixed with the abrasive particles. Sufficient solvent should be used to form a mass having the consistency of varnish. This varnish is poured upon the paper or cloth to form a thin coating. If desired, the abrasive particles may be located by electrostatic means so that their major axes are positioned substantially perpendicular to the surface of the sheet material. The coated sheet is dried to remove the solvent and then heated to cure or copolymerize the binder composition.

As illustrative of the liquid monomers which may be used as the temporary plasticizing copolymerizable component of the heat convertible binder composition may be mentioned glycol dimethacrylate, divinyl ether, vinyl allyl ether, allyl acrylate, diallyl ether, dimethallyl ether, the diallyl esters of aliphatic cyclo-aliphatic and aromatic dicarboxylic acids may be mentioned oxalic, malonic, succinic, adipic, glutaric, phthalic, pimelic, sebacic, azeleic, suberic, methoxy succinic, ethoxy succinic, phenoxy succinic, alpha ethyl succinic acids; also cyclopropane dicarboxylic acids, cyclohexane dicarboxylic acids, alkyl cycloalkane dicarboxylic acids, the aryl cycloalkane dicarboxylic acids, the phthalic acids, isophthalic acids, benzoyl phthalic acids, nitrophthalic acids, halogenated phthalic acids, alkyl phthalic acids, benzophenone dicarboxylic acids, diphenyl ether dicarboxylic acids.

The base material of the binder, that is, the partial copolymer of diallyl maleate and styrene or other vinyl aryl compound may be modified by copolymerizing the diallyl maleate and vinyl aryl compound together with another monomer having one or more $CH_2=C<$ groups. As illustrative of such other monomers may be mentioned vinyl halides, e. g., vinyl chloride; the vinylidene halides, e. g., vinylidene chloride, vinylidene fluorochloride, etc.; the acrylic acids, e. g., acrylic acid, methacrylic acid, chloroacrylic acid; the esters of acrylic acid, e. g., methyl acrylate, ethyl acrylate, ethyl methacrylate, methyl methacrylate, methyl chloracrylate, fluorophenyl acrylate, etc.; the aryl ethylenes, e. g., styrene, methyl styrene, isopropenyl toluene, toluyl ethylene, bromotoluyl ethylene, etc.; the vinyl esters, e. g., vinyl acetate, vinyl propionate, vinyl butyrate, vinyl benzoate; the nitrile derivatives of acrylic and methacrylic acid, e. g., acrylonitrile, methacrylonitrile, etc.; methylene malonic esters; the mono alkyl esters, e. g., the methyl ester; the diesters, e. g., the dimethyl ester, the dipropyl ester, etc.; the allyl derivatives, e. g., acrolein, methacrolein, allyl methyl ketone, allyl ethyl ketone, allyl chloride, allyl methyl ether, allyl ethyl ether, allyl propyl ether, allyl phenyl ether, allyl acetate, allyl propionate, allyl benzoate, vinyl ethyl ketone, allyl acrylate, methallyl acrylate, diallyl phthalate, diallyl oxalate, diallyl succinate, divinyl ether, diallyl ether, divinyl ketone, diallyl ketone, dimethallyl ketone, etc.

*Example A.—Preparation of partial copolymer of styrene and diallyl maleate*

A partial copolymer of styrene and diallyl maleate was prepared by copolymerizing equimolar quantities of styrene and diallyl maleate in solution to incipient gelation in accordance with the following procedure.

The following quantities of material were weighed out:

|  | Grams |
|---|---|
| Styrene | 83.2 |
| Diallyl maleate | 156.8 |
| Toluol | 240.0 |
| Benzoyl peroxide | 2.4 |

The above materials were placed in a 1-liter, round-bottom, three-neck flask equipped with a thermometer, air-driven stirrer and reflux condenser. The reaction mixture was heated to reflux in an oil bath. The course of the reaction was followed by taking samples of the reaction mixture at periodic intervals and determining the resin content. As the reaction proceeded the viscosity of the mixture tended to increase. The reaction mixture was heated only during the day time and was allowed to cool off over night. At the end of 44 hours total heating time the mixture showed signs of incipient gelation and so it was cooled rapidly by substituting a bath of cold water for the oil bath. A resin determination showed that the reaction had proceeded to 65% of completion. The partial copolymer was precipitated by pouring the cold viscous reaction mixture into an excess of ethyl alcohol. The product precipitated as a light cream-colored taffy-like mass which became friable upon continued extraction with ethyl alcohol and tended to break up into a fine white powder. This was filtered off and washed with three portions of fresh alcohol. The product was then dried for 8 hours in a vacuum oven at 50° C. The partial copolymer prepared in this manner is a white, free flowing odorless powder that is soluble and fusible.

*Example 1.—Preparation of molded abrasive article*

A molding compound was prepared according to the following formula:

| | |
|---|---|
| Copolymer of Example A grams | 2.0 |
| Diallyl maleate (liquid monomer) do | 0.5 |
| Benzoyl peroxide do | 0.025 |
| Acetone cc | 6 |
| Carborundum (#150) grams | 12.5 |

The copolymer and benzoyl peroxide were dissolved in a mixture of the liquid diallyl maleate and acetone producing a viscous solution which was then added to the carborundum powder and the two mixed thoroughly. The pasty mass was then dried in a vacuum oven at 50° C. to remove the acetone. The result was a dry crumbly mass capable of use as a molding compound. This compound was then placed in a hot die having a 1″ diameter cavity and molded for 15 minutes at 160° C. under 10,000 pounds pressure. The sample was removed from the die while still hot. The resulting piece was very hard and strong. It was completely filled out and well knit.

*Example 2.—Preparation of molded combination abrasive block*

The procedure described below was followed to prepare a combination abrasive block. Two molding compounds were prepared according to the following formulae:

| | | A | B |
|---|---|---|---|
| Copolymer of Example A | grams | 1.6 | 1.6 |
| Diallyl maleate | do | .4 | .4 |
| Benzoyl peroxide | do | .02 | .02 |
| Acetone | cubic centimeters | 5 | 5 |
| Carborundum (#150) | grams | 10 | |
| Carborundum (F) | do | | 10 |

The copolymer and benzoyl peroxide were dissolved in a mixture of the diallyl maleate and acetone in both cases. The viscous solutions were then added to their respective quantities of carborundum powder and then mixed together thoroughly. The two pasty masses were then dried in a vacuum oven at 50° C. to remove the acetone. The resultant molding compounds were dry, crumbly masses. Both molding compounds were preformed by compressing in a cold die having a 1" x 2" cavity under 15,000 pounds pressure. After the preforms had been removed, the die was heated to 160° C. The preforms were then carefully placed in superposition in the die cavity. The combination was then molded for 15 minutes at 160° C. under 20,000 pounds pressure. The sample was removed from the die while still hot. The resulting piece was very hard and strong and showed a sharply defined division between the two abrasive compounds. The entire sample was well bonded and there was no tendency for the two layers to separate.

*Example 3.—Preparation of abrasive sheet material*

To prepare an abrasive sheet material a varnish is formed with the following formula:

| | |
|---|---|
| Copolymer of Example A _____grams__ | 1.6 |
| Diallyl maleate _____do____ | 0.4 |
| Benzoyl peroxide _____do____ | 0.02 |
| Acetone _____cc__ | 10 |
| Carborundum (#150) _____grams__ | 10 |

The copolymer and benzoyl peroxide are dissolved in a mixture of the diallyl maleate and acetone. This solution then is thoroughly mixed with the carborundum powder to form a varnish. A sheet of paper is coated by pouring the varnish upon its surface and the coated sheet then is dried in a vacuum oven at 50° C. to remove the acetone. The dried sheet material then is heated for 15 minutes at 160° C.

*Example 4.—Preparation of molding composition*

A molding composition is prepared according to the following formula:

| | Parts by weight |
|---|---|
| Copolymer of Example A _____ | 1.6 |
| Diallyl maleate (liquid monomer) _____ | 0.4 |
| Benzoyl peroxide _____ | 0.02 |

The above materials are placed in a heated Banbury mixer and thoroughly mixed. When cooled the mixture is a crumbly solid which can be placed in a hot die and molded in 10 minutes at 160° C. under 1000 to 4000 pounds pressure.

*Example 5.—Preparation of abrasive molding composition*

A molding composition is prepared according to the following formula:

| | Parts by weight |
|---|---|
| Copolymer of Example A _____ | 1.6 |
| Diallyl maleate (liquid monomer) _____ | 0.4 |
| Benzoyl peroxide _____ | 0.02 |
| Carborundum _____ | 10 |

The copolymer and monomer are mixed in a dough mixer. This mixture then is mixed with the abrasive particles in a muller.

I claim:

1. A heat convertible molding composition adapted to the preparation of abrasive articles which comprises a mixture of (1) a preformed solid, soluble, fusible, partial copolymerization product of a mixture comprising diallyl maleate and a compound having the structure $CH_2=CRZ$ where R is selected from the group consisting of hydrogen and a methyl radical and Z is selected from the group consisting of an aryl radical and a substituted aryl radical, (2) a liquid copolymerizable monomer, and (3) abrasive particles.

2. A heat convertible molding composition adapted to the preparation of abrasive articles which comprises a mixture of (1) a preformed solid, soluble, fusible, partial copolymer of a mixture comprising diallyl maleate and a compound having the structure $CH_2=CRZ$ where R is selected from the group consisting of hydrogen and a methyl radical and Z is selected from the group consisting of an aryl radical and a substituted aryl radical, (2) a liquid copolymerizable monomer, (3) a volatile miscible liquid, and (4) abrasive particles.

3. A molding composition adapted to the preparation of abrasive articles which comprises a mixture of (1) abrasive particles, (2) a solid, soluble fusible partial copolymerization product of a mixture comprising diallyl maleate and a compound having the structure $CH_2=CRZ$ where R is selected from the group consisting of hydrogen and a methyl radical and Z is selected from the group consisting of an aryl radical and a substituted aryl radical, (3) a liquid monomer copolymerizable with the copolymer and having at least one $CH_2=C<$ group and at least one other polymerizable ethylenic group, and (4) a miscible volatile liquid.

4. A molding composition adapted to the preparation of abrasive articles which comprises a mixture of (1) a soluble and fusible partial copolymer, (2) abrasive particles and (3) a liquid monomer, said partial copolymer being the partial copolymerization product of a mixture comprising diallyl maleate and a compound having the structure $CH_2=CRZ$ where R is selected from the group consisting of hydrogen and a methyl radical and Z is selected from the group consisting of an aryl radical and a substituted aryl radical, said monomer being copolymerizable with said partial copolymer and having at least one $CH_2=C<$ group.

5. An abrasive article comprising abrasive particles embedded in a binder which is a copolymerization product of a mixture comprising diallyl maleate and a compound having the structure $CH_2=CRZ$ where R is selected from the group consisting of hydrogen and a methyl radical and Z is selected from the group consisting of an aryl radical and a substituted aryl radical.

6. An abrasive article comprising abrasive particles embedded in a binder which is a copolymerization product of a mixture comprising diallyl maleate and styrene.

7. A molded abrasive article comprising a compacted mixture of abrasive particles and an insoluble and infusible copolymerization product of a mixture comprising diallyl maleate and a compound having the structure $CH_2=CRZ$ where R is selected from the group consisting of hydrogen and a methyl radical and Z is selected from the group consisting of an aryl radical and a substituted aryl radical.

8. An abrasive sheet comprising a sheet of paper, cloth and the like having a coating which is essentially abrasive particles embedded in the copolymerization product of a mixture comprising diallyl maleate and a compound having the structure $CH_2=CRZ$ where R is selected from the group consisting of hydrogen and a methyl radical and Z is selected from the group consisting of an aryl radical and a substituted aryl radical.

9. A composition adapted to be molded under heat and pressure to form an abrasive article which is a uniform mixture comprising abrasive particles, diallyl maleate and a soluble and fusible partial copolymerization product of a mixture comprising diallyl maleate and a compound having the structure $CH_2=CRZ$ where R is selected from the group consisting of hydrogen and a methyl radical and Z is selected from the group consisting of an aryl radical and a substituted aryl radical.

10. A composition adapted to be molded under heat and pressure to form an abrasive article which is a uniform mixture comprising abrasive particles, diallyl maleate and a soluble and fusible partial copolymerization product of a mixture comprising diallyl maleate and styrene.

11. A composition adapted to be molded under heat and pressure to form an abrasive article having an insoluble and infusible binder comprising a uniform mixture of abrasive particles, a liquid monomer and a soluble and fusible partial copolymerization product of a mixture comprising diallyl maleate and a compound having the structure $CH_2=CRZ$ where R is selected from the group consisting of hydrogen and a methyl radical and Z is selected from the group consisting of an aryl radical and a substituted aryl radical, said monomer being copolymerizable with said copolymerization product and having at least one $CH_2=C<$ group and at least one other polymerizable ethylenic group.

12. A composition adapted to be molded under heat and pressure to form an abrasive article having an insoluble and infusible binder comprising a soluble and fusible partial copolymerization product of a mixture comprising diallyl maleate and styrene in which abrasive particles and a liquid monomer are uniformly mixed, said monomer being copolymerizable with said copolymerization product and having at least one $CH_2=C<$ group and at least one other polymerizable ethylenic group.

GAETANO F. D'ALELIO.

Disclaimer 2,403,213.—*Gaetano F. D'Alelio*, Northampton, Mass. SYNTHETIC RESIN BONDED ABRASIVE. Patent dated July 2, 1946. Disclaimer filed Jan. 23, 1948, by the assignee, *Pro-Phy-Lac-Tic Brush Company*.

Hereby enters this disclaimer to claims 5, 7, and 8 of said patent.

[*Official Gazette Mar. 2, 1948.*]

cal and Z is selected from the group consisting of an aryl radical and a substituted aryl radical.

9. A composition adapted to be molded under heat and pressure to form an abrasive article which is a uniform mixture comprising abrasive particles, diallyl maleate and a soluble and fusible partial copolymerization product of a mixture comprising diallyl maleate and a compound having the structure $CH_2=CRZ$ where R is selected from the group consisting of hydrogen and a methyl radical and Z is selected from the group consisting of an aryl radical and a substituted aryl radical.

10. A composition adapted to be molded under heat and pressure to form an abrasive article which is a uniform mixture comprising abrasive particles, diallyl maleate and a soluble and fusible partial copolymerization product of a mixture comprising diallyl maleate and styrene.

11. A composition adapted to be molded under heat and pressure to form an abrasive article having an insoluble and infusible binder comprising a uniform mixture of abrasive particles, a liquid monomer and a soluble and fusible partial copolymerization product of a mixture comprising diallyl maleate and a compound having the structure $CH_2=CRZ$ where R is selected from the group consisting of hydrogen and a methyl radical and Z is selected from the group consisting of an aryl radical and a substituted aryl radical, said monomer being copolymerizable with said copolymerization product and having at least one $CH_2=C<$ group and at least one other polymerizable ethylenic group.

12. A composition adapted to be molded under heat and pressure to form an abrasive article having an insoluble and infusible binder comprising a soluble and fusible partial copolymerization product of a mixture comprising diallyl maleate and styrene in which abrasive particles and a liquid monomer are uniformly mixed, said monomer being copolymerizable with said copolymerization product and having at least one $CH_2=C<$ group and at least one other polymerizable ethylenic group.

GAETANO F. D'ALELIO.

Disclaimer 2,403,213.—*Gaetano F. D'Alelio*, Northampton, Mass. SYNTHETIC RESIN BONDED ABRASIVE. Patent dated July 2, 1946. Disclaimer filed Jan. 23, 1948, by the assignee, *Pro-Phy-Lac-Tic Brush Company*.

Hereby enters this disclaimer to claims 5, 7, and 8 of said patent.

[*Official Gazette Mar. 2, 1948.*]